3,167,597
PROCESS FOR THE CATALYTIC SPLITTING OF
ISOBUTENE OLIGOMERS
Walter Krönig, Wulf Schwerdtel, and Karl-Heinz Vöpel, all of Leverkusen, Germany, assignors to Farbenfabriken Bayer Aktiengesellschaft, Leverkusen, Germany, a corporation of Germany
No Drawing. Filed Jan. 23, 1962, Ser. No. 168,236
Claims priority, application Germany Jan. 25, 1961
9 Claims. (Cl. 260—683)

This invention relates to the catalytic splitting of butene oligomers and especially to catalysts useful therefor.

It is known to split oligomers of isobutene (for example diisobutene and triisobutene) at high temperature into isobutene, using natural as well as synthetic silicates, in particularly aluminum and magnesium silicates. These silicates are generally designated as bleaching earths. It is also known to add to these catalysts relatively small quantities of compounds of metals of the 1st or 8th sub-group of the Periodic System of the elements. These catalysts have a good cracking activity per se, but the activity subsides relatively quickly, so that in order to maintain a satisfactory cracking effect, the temperature must be raised progressively at relatively short time intervals. A point is then however reached very soon at which undesirable secondary reactions occur, in particular cracking and an isomerisation so that it is no longer possible to obtain pure isobutene in a good yield.

It is an object of the invention to provide novel catalysts for the splitting of butene oligomers. More objects will appear hereinafter.

It has now been found that butene oligomers can be catalytically split in an industrially advantageous manner by using phosphates of boron and/or aluminum as catalysts for the splitting of the butene oligomers. An additional improvement is produced if small quantities of nickel are added as salts to the catalysts.

As catalyst, there are advantageously used the so-called neutral phosphates, in which one atom of boron or aluminum is combined with one atom of phosphorous. The catalysts can be used in a compact form or on supports.

The boron phosphate is preferably used on supports, and supports having a large intrinsic surface are particularly suitable, mainly silica gel or highly active aluminum oxide. The concentration of boron phosphate on the support is preferably chosen to be between 3 and 20% by weight. One particularly active boron phosphate catalyst is obtained by impregnating the support with a stoichiometric mixture of the boric acid ester (e.g., boric acid tripropyl ester) with alcoholic phosphoric acid solution, so that the support contains 10% of boron phosphate. After the impregnation, the support is slowly heated and the reaction of the boric acid ester with the phosphoric acid takes place with formation of the required boron phosphate. The catalyst is then heat-treated for one hour at 800 to 1000° C. However, the boron phosphate can also be prepared on supports by other known methods, for example impregnating the support with boric acid, then subsequently impregnating it with phosphoric acid and then heating.

One suitable method of production for the aluminum phosphate consists in mixing an aqueous aluminum nitrate solution with the stoichiometric quantity of phosphoric acid and precipitating the aluminum phosphate by adding the stoichiometric quantity of ammonia. It is not necessary for the precipitate to be washed but it is dried as such and heat-treated at 600 to 800° C. The ammonium salts which escape on heating produce porosity in the catalyst. However, aluminum phosphate can also be applied to supports, and supports having a low intrinsic porosity can be used instead of the highly active supports.

Mixtures of boron phosphate and aluminum phosphate can also be used as catalysts. For example, mixtures of aluminum nitrate and boric acid in aqueous solution are used and such quantities of phosphoric acid are added that both can be transformed into neutral phosphates. The mixed phosphates may then be precipitated by adding ammonia and the catalyst is prepared in the manner described in connection with aluminum phosphate.

The nickel compound, such as nickel carbonate, nickel phosphate etc., advantageously nickel nitrate, is advantageously added to the phosphoric acid solution. It is for example possible to use additions of 0.03 to 1% by weight of nickel (calculated as metal), based on the final catalyst.

When the activity of these catalysts has fallen or when a cracking temperature has been reached, at which the isobutene is no longer obtained in the required purity, these catalysts can be regenerated simply by treating them with oxygen-containing gases, for example mixtures of nitrogen and oxygen, at temperature of about 500° C. After this regeneration, the catalysts have their initial activity. The catalysts are advantageously fixedly arranged in the reaction chamber, for example, in the form of balls, pills or rolls, with sizes between 2 and 10 mm. Catalyst beds of 0.5 to 10 m. are for example suitable. Preferably the hydrocarbons to be reacted are conducted in a downward stream through the catalyst bed.

It is advantageous to use oligomers of iso-butene, mainly diisobutene or triisobutene, as starting materials for the process. The butene oligomers can also be copolymers of isobutene and n-butene. However, mixtures containing n-butene are then naturally obtained on splitting whereby the n-butene content is smaller than to be expected on considering the copolymer content in the starting material. The oligomers are generally obtained by known processes by oligomerisation of hydrocarbons containing isobutene, in particular those with 4 carbon atoms. It is generally advisable to subject diisobutene or triisobutene independently to the splitting (depolymerisation), but if desired mixtures of both oligomers can be used in the splitting operation or the impure polymerisation product itself. The cracking can for example be carried out at temperatures from 220 to 320° C. At higher temperatures, secondary reactions generally occur, which disadvantageously affect the purity of the isobutene which is produced. It is advisable to use temperatures such that about 30 to 60% by weight of $C_4$-hydrocarbons are formed in a single passage through the reaction chamber. When the cracking activity of the catalyst falls, the temperature is slowly raised until the limit defined above is reached. The catalyst is then regenerated. When triisobutylene is used, diisobutene, containing codimer, is formed as well as isobutene. This diisobutene can also be extracted for other uses, but it can also be subjected by itself or together with unconverted triisobutene to a fresh cracking operation.

Ordinary, lowered or slightly elevated pressures can be used. The use of a slightly elevated pressure, for example 4 to 8 atm., is particularly advantageous, since then the $C_4$-hydrocarbons which form on splitting are obtained in a liquid state, dissolved in the higher hydrocarbons, after cooling the reaction products to room temperature, thus substantially simplifying the working up, since the reaction product has only then to be subjected to a fractional distillation.

Suitable throughputs of initial material are for example 0.5 to 3 kg./per litre of catalyst per hour. The catalysts used according to the invention have inter alia the advantage that their activity and selectivity is maintained for a substantially longer period than is the case with the prior known catalysts.

*Example 1*

To produce the catalyst, silica gel balls with a diameter of 3 to 4 mm. were impregnated with an equimolecular mixture of boric acid tripropyl ester and phosphoric acid, dissolved in methanol, in such a quantity that the final catalyst contained 9% by weight of boron phosphate. Nickel nitrate was added to the phosphoric acid solution in such a quantity that 0.1% by weight of nickel (as phosphate) was contained in the final catalyst. After the impregnation, the catalyst was slowly heated to 100° C. and then heat-treated for 1 hour at 800° C. The catalyst was fixedly arranged in a vertical tube with an internal diameter of 30 mm. At a temperature of 220° C., a triisobutylene fraction was conducted downwardly through this catalyst under a pressure of 5 atm. After passage through the reaction chamber, it was cooled to room temperature and the reaction product then worked up by pressure distillation into $C_4$-hydrocarbons as a top fraction on the one hand, and hydrocarbons of a higher boiling point as a sump fraction on the other hand. The triisobutylene was conducted in an hourly quantity of 1.4 kg. through 1 litre of catalyst volume. The reaction product contained 42% by weight of $C_4$-hydrocarbons. A small quantity of propylene and isobutane was distilled off from the $C_4$-fraction. The remaining $C_4$-fraction contained 99.8% by weight of isobutene. The remaining fraction of the reaction product, which is liquid at ordinary pressure, consists of ⅔ of diisobutene, containing codimer, and ⅓ of triisobutene.

*Example 2*

To a solution of aluminum nitrate was added an equimolecular quantity of phosphoric acid in aqueous solution. By adding ammonia, aluminum phosphate was precipitated. This was then filtered off and dried without washing and then converted into pills with a diameter of 4 mm., which were heat-treated at 600° C.

Cracking was carried out in the manner described in Example 1, but using diisobutylene instead of triisobutylene. The cracked product which was obtained contained 60% by weight of $C_4$-hydrocarbons, and after driving off a small quantity of propylene and isobutane, also contained 99.8% by weight of isobutene.

We claim:

1. A process for the catalytic splitting of isobutene oligomers, which comprises contacting said isobutene oligomer at a temperature of 220–320° C. with a catalyst comprising a phosphate of a member selected from the group consisting of boron, aluminum and mixtures thereof.

2. Process according to claim 1 wherein said catalyst additionally contains 0.03 to 1% by weight of a nickel salt (calculated as metal) based on the final catalyst.

3. Process according to claim 1 wherein said isobutene oligomer is a member selected from the group consisting of diisobutene and triisobutene.

4. Process according to claim 1 wherein said catalyst comprises a phosphate of a member selected from the group consisting of boron and aluminum maintained on a solid support.

5. Process according to claim 4 wherein said catalyst additionally contains 0.03 to 1% by weight of a nickel salt (calculated as metal).

6. Process according to claim 4 wherein said catalyst has a particle size of between about 2 and 10 mm.

7. Process according to claim 1 wherein said nickel salt is a member selected from the group consisting of nickel carbonate, nickel phosphate and nickel nitrate.

8. Process according to claim 1 wherein said catalyst comprises 9% by weight of boron phosphate and 0.1% by weight of a nickel salt (calculated as metal) maintained on a solid support.

9. Process according to claim 1 wherein said catalyst comprises aluminum phosphate.

References Cited in the file of this patent
UNITED STATES PATENTS

| | | |
|---|---|---|
| 2,301,913 | Veltman | Nov. 17, 1942 |
| 2,390,951 | Leum et al. | Dec. 11, 1945 |
| 2,552,692 | Schulze et al. | May 15, 1951 |
| 2,951,883 | Kroeper et al. | Sept. 6, 1960 |